(12) United States Patent
Wallis et al.

(10) Patent No.: US 11,204,739 B2
(45) Date of Patent: Dec. 21, 2021

(54) MICROCONTROLLER FOR EXECUTING A CONFIGURABLE PROCESSING OPERATION

(71) Applicants: STMicroelectronics (Grenoble 2) SAS, Grenoble (FR); STMicroelectronics (Rousset) SAS, Rousset (FR)

(72) Inventors: Mark Wallis, Mouans Sartoux (FR); Yannick Sebillet, Saint Georges de Commiers (FR)

(73) Assignees: STMICROELECTRONICS (GRENOBLE 2) SAS, Grenoble (FR); STMICROELECTRONICS (ROUSSET) SAS, Rousset (FR)

( * ) Notice: Subject to any disclaimer, the term of this patent is extended or adjusted under 35 U.S.C. 154(b) by 182 days.

(21) Appl. No.: 16/599,581

(22) Filed: Oct. 11, 2019

(65) Prior Publication Data

US 2020/0133636 A1 Apr. 30, 2020

(30) Foreign Application Priority Data

Oct. 24, 2018 (FR) ...................................... 1859813

(51) Int. Cl.
*G06F 7/544* (2006.01)
*G06F 17/14* (2006.01)
*G06F 17/16* (2006.01)

(52) U.S. Cl.
CPC .......... *G06F 7/5443* (2013.01); *G06F 17/142* (2013.01); *G06F 17/16* (2013.01)

(58) Field of Classification Search
CPC ...... G06F 7/5443; G06F 17/16; G06F 17/142; G06F 9/3877; G05B 19/0423; G05B 2219/25257

USPC .......................................................... 708/231
See application file for complete search history.

(56) References Cited

U.S. PATENT DOCUMENTS

| 6,591,230 | B1 | 7/2003 | Ding et al. |
| 9,639,328 | B2* | 5/2017 | Narayanamoorthy .... G06F 1/32 |
| 2016/0306635 | A1* | 10/2016 | Nakajima ............. G06F 9/4401 |
| 2018/0315158 | A1* | 11/2018 | Nurvitadhi ............ G06F 9/3017 |
| 2020/0217386 | A1* | 7/2020 | Kordunsky ............. F16F 7/104 |
| 2020/0371785 | A1* | 11/2020 | Wang ..................... G06F 17/10 |

FOREIGN PATENT DOCUMENTS

| CN | 101286115 A | 10/2008 |
| CN | 102043609 A | 5/2011 |

OTHER PUBLICATIONS

Fons, Francisco, et al., "Dynamically Reconfigurable CORDIC Coprocessor for Trigonometric Computing", 19th International Conference on Architecture of Computing Systems, Mar. 1, 2006, pp. 254-263.

* cited by examiner

*Primary Examiner* — Tan V Mai
(74) *Attorney, Agent, or Firm* — Slater Matsil, LLP

(57) ABSTRACT

A microcontroller is capable of executing a process that is parameterizable by at least one parameter. The microcontroller includes a processor and a hardware module coupled to the processor. The hardware module is configured to hardware execute the process and the processor is configured to deliver the at least one parameter to the hardware module.

20 Claims, 5 Drawing Sheets

MICROCONTROLLER FOR EXECUTING A CONFIGURABLE PROCESSING OPERATION

CROSS-REFERENCE TO RELATED APPLICATIONS

This application claims priority to French Patent Application No. 1859813, filed on Oct. 24, 2018, which application is hereby incorporated herein by reference.

TECHNICAL FIELD

Embodiments of the invention relate to microcontrollers.

BACKGROUND

There are DSP ("Digital Signal Processing") digital signal coprocessors dedicated to the software execution of functions for freeing the bandwidth of the processor of a microcontroller. DSP digital signal coprocessors generally have high performance but are very expensive.

Other types of processing, e.g., digital signal filtering, matrix operations or fast Fourier transforms are typically executed in software by the processor, and are generally repeated on a large amount of data. This forces the processor to execute this task, for which it is also not always optimized.

SUMMARY

Embodiments of the invention disclose a microcontroller for executing a configurable processing operation. Some embodiments can provide a less expensive alternative for the execution of this processing.

One solution provided according to some embodiments is to supply a very cheap and versatile module dedicated to a specific processing and coupled to the processor, for relieving the processor from this processing.

According to one aspect, a microcontroller is provided for executing a processing parameterizable by at least one parameter. The microcontroller comprises a processor and a hardware module coupled to the processor and configured for hardware executing the processing. The processor is configured for delivering the at least one parameter to the hardware module.

A hardware module is an element that is physically "hard" programmed during its manufacture, conventionally for implementing a calculation. A hardware module and its hardware programming are usually designated by the terms "hardware" and "hardware programmed" or "hardware coded".

Parameters are understood to mean values defining and varying the implementation of a given type of processing, e.g., parameters defining a cutoff frequency of a filter type of processing. Parameters are different from the values of input variables of the processing, to which calculations are applied.

Thus a microcontroller in particular is provided comprising a universal hardware module for a given type of processing, e.g., a digital filter, the processing being able to be parameterized according to any application, while benefiting from low cost and low energy consumption. The processor of the microcontroller may then be freed from executing processing of this type and take over other operations for which it is better optimized. In other words, the performance of the microcontroller, notably the speed, is improved.

According to one embodiment, the processing is of a specific type chosen from the group comprising a digital filter, a matrix calculation, and a fast Fourier transform.

Indeed, these three examples of processing may be executed by the same elementary circuits, and depend on the order of execution of the operations. Thus, the manufacturer of the microcontroller may choose notably from these three types of processing, by adapting the timing of the operations without necessarily modifying the other elements of the hardware module.

According to one embodiment, the hardware module comprises an input register intended for receiving input values of the processing, an output register intended for supplying output values of the processing, and at least one parameters register configured for storing the values of the at least one parameter.

For example, the input register, the output register and the at least one parameters register are located in respective memory locations in a shared register.

This makes it possible to benefit from flexibility, for example, for optimizing the use of the memory space, or for adapting the memory of the shared register to constraints depending on a given use context.

Advantageously, the input register, the output register and the at least one parameters register are capable of receiving and storing groups of values intended for a future execution of the processing.

This is notably used for packet data transfers, notably in reception, and for reducing the probability of congestion and blocking of memory entries.

According to one embodiment, the microcontroller further comprises a direct memory access driver device, wherein the hardware module is configured for generating write requests in the input register or (i.e., and/or) read requests in the output register, the requests being intended for and adapted to the direct memory access driver device.

This makes it possible to avoid the use of interrupt signals intended for the microprocessor and makes it possible to further relieve the microprocessor from the input-output management tasks of the hardware module.

According to one embodiment, the hardware module comprises a multiplier and accumulator circuit and a hardware configured sequencer for driving the multiplier and accumulator circuit so as to execute the processing.

The commands for driving the operations of the multiplier and accumulator circuit, delivered by the sequencer, define the processing to be executed by the hardware module, also parameterized by parameters. In addition, it is possible to perform various types of processing from the same elements of the multiplier and accumulator circuit, by varying the order of execution of the operations of each element, controlled by the sequencer. Thus, modifying the sequencer makes it possible to modify the type of processing executed by the hardware module and to adapt the module to different embodiments of microcontrollers intended for executing different processing.

According to one embodiment, the at least one parameter comprises at least one parameter representative of a compromise between the dynamics of the values resulting from the processing and the accuracy of these values, the multiplier and accumulator circuit being configured for implementing this compromise during the execution of the processing.

For example, the multiplier and accumulator circuit is configured for truncating N most significant bits and A-N least significant bits on a computational value comprising M bits, with A being a positive integer such that A<M and N being an integer such that o≤N≤A, and applying a compensation gain $2^N$ on the values resulting from the truncation, the at least one parameter representative of a compromise between the dynamics of the values resulting from the processing and the accuracy of these values comprising the number N, and optionally the number A.

This provides additional flexibility in the execution of the processing, according, for example, to the context given by the values of the parameters and/or by the input values. "Dynamics of the values" is understood to mean the range of possible values of the results of the processing, which may be expressed by the maximum possible value, or the number of bits in the binary writing of these values.

According to another aspect, a hardware module is provided configured for hardware executing a processing parameterizable by at least one parameter, the at least one parameter being intended to be delivered by a processor of a microcontroller.

According to some embodiments, the function may be of a specific type chosen from the group comprising a digital filter, a matrix calculation, or a fast Fourier transform. The hardware module may comprise an input register intended for receiving input values of the processing, an output register intended for supplying output values of the processing, and at least one parameters register configured for storing the values of the at least one parameter. The input register, the output register and the at least one parameters register may be located in respective memory locations in a shared register. The input register, the output register and the at least one parameters register may be capable of receiving and storing groups of values intended for a future execution of the processing. The hardware module may be configured for generating write requests in the input register and/or read requests in the output register, which requests may be intended for and adapted to an ancillary direct memory access driver device.

The hardware module may comprise a multiplier and accumulator circuit and a hardware configured sequencer for driving the multiplier and accumulator circuit so as to execute the processing. The at least one parameter may comprise at least one parameter representative of a compromise between the dynamics of the values resulting from the processing and the accuracy of these values, the multiplier and accumulator circuit being configured for implementing this compromise during the execution of the processing. For example, the multiplier and accumulator circuit is configured for truncating N most significant bits and A-N least significant bits on a computational value comprising M bits, with A a positive integer such that A<M and N an integer such that o≤N≤A, and applying a compensation gain $2^N$ on the values resulting from the truncation, the at least one parameter representative of a compromise between the dynamics of the values resulting from the processing and the accuracy of these values comprising the number N, and optionally the number A.

An electronic apparatus is also provided, such as an onboard computer of a vehicle, comprising a microcontroller as defined above.

BRIEF DESCRIPTION OF THE DRAWINGS

Other advantages and features of the invention will appear on examining the detailed description of embodiments and implementations, in no way restrictive, and the appended drawings in which.

DETAILED DESCRIPTION OF ILLUSTRATIVE EMBODIMENTS

Figure 1:
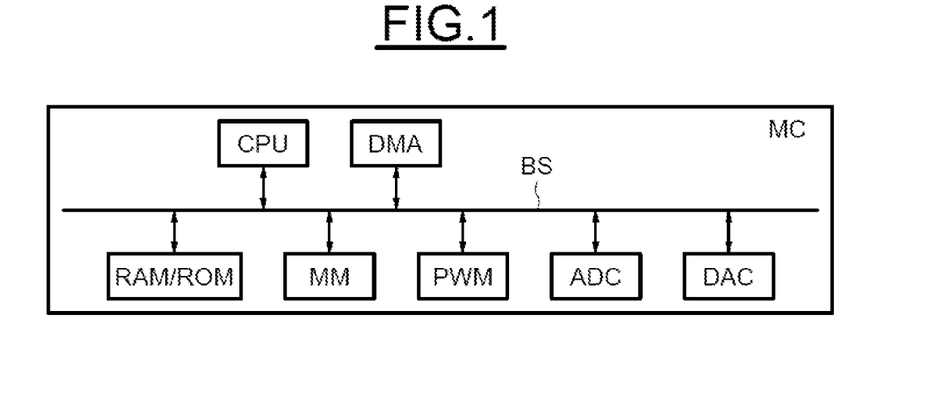
FIGS. 1 to 6 schematically illustrate different embodiments of the invention.

FIG. 1 represents an embodiment of a microcontroller MC, comprising a CPU and a hardware module MM. The microcontroller is notably intended for executing a processing. The hardware module MM is configured for hardware executing the processing. The processing executed by the hardware module MM is parameterizable by at least one parameter, and the processor CPU is configured for delivering the at least one parameter to the hardware module MM.

The microcontroller further comprises as an accessory a memory element that may comprise a random access memory RAM and a non-volatile memory ROM, a direct memory access driver device DMA, input-output interfaces such as a digital-to-analogue converter DAC, an analogue-to-digital converter ADC and a pulse width modulator PWM.

The various elements of the microcontroller, i.e., in this example the processor, the hardware module, the memory element, the direct memory access device, and the input-output interfaces may communicate with each other via an integrated circuit bus BS.

For example, the integrated circuit bus BS is of the AHB (Advanced High-performance Bus) type.

Thus, the parameters parameterizing the processing hardware executed by the hardware module MM, may be transmitted to the hardware module MM and by the CPU via the integrated circuit bus BS.

The processing is preferably of a specific type chosen from the group comprising a digital filter, a matrix calculation, and a fast Fourier transform.

The parameterization of a digital filter type of processing may correspond, for example, to coefficients describing the impulse response of the filter.

The parameterization of a matrix calculation may correspond, for example, to the definition of this calculation, such as a scalar product or a vector product, as well as to the definition of the dimensions of the matrix.

The parameterization of a fast Fourier transform may correspond, for example, to its complexity setting (the number of points).

In any case, being parameterizable, the processing enjoys a flexibility in execution. The parameterization of the processing may, for example, comprise a mathematical definition of a function used during the processing, a selection of certain computational circuit portions of the hardware module, a choice of the order of a calculation, or even successive reiterations of executing the processing, optionally parameterized between each execution.

Because of the hardware execution of the processing by the hardware module, the performance of the microcontroller is improved at lower cost. In addition, the use of the microcontroller is greatly simplified, e.g., by comparison with a conventional system of the DSP type, in which software dedicated to the execution of the processing has to be programmed by the user, notably with dedicated circuitry and the required precautions.

Figure 2:
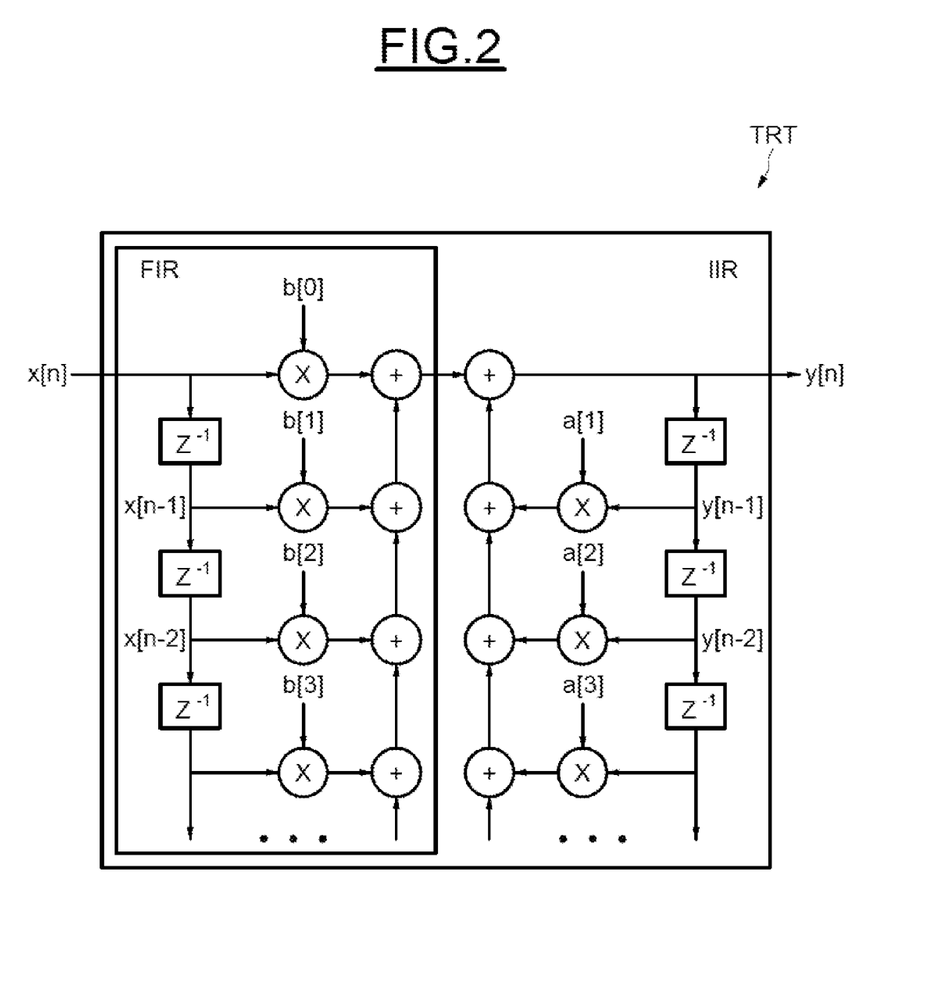

FIG. 2 represents a functional diagram of a chosen example of processing TRT of the digital filter type.

This example of a digital filter comprises an infinite impulse response filter IIR, comprising a first stage finite impulse response filter FIR.

The finite impulse response filter FIR is a convolution of the shifted input samples x[n], x[n−1], x[n−2], ... with a reaction coefficient vector b[0], b[1], b[2], ... generating output samples y[n].

The infinite impulse response filter IIR comprises a convolution of the shifted output samples, y[n−1], y[n−2], ... with a feedback coefficient vector a[1], a[2], ....

Figure 3:
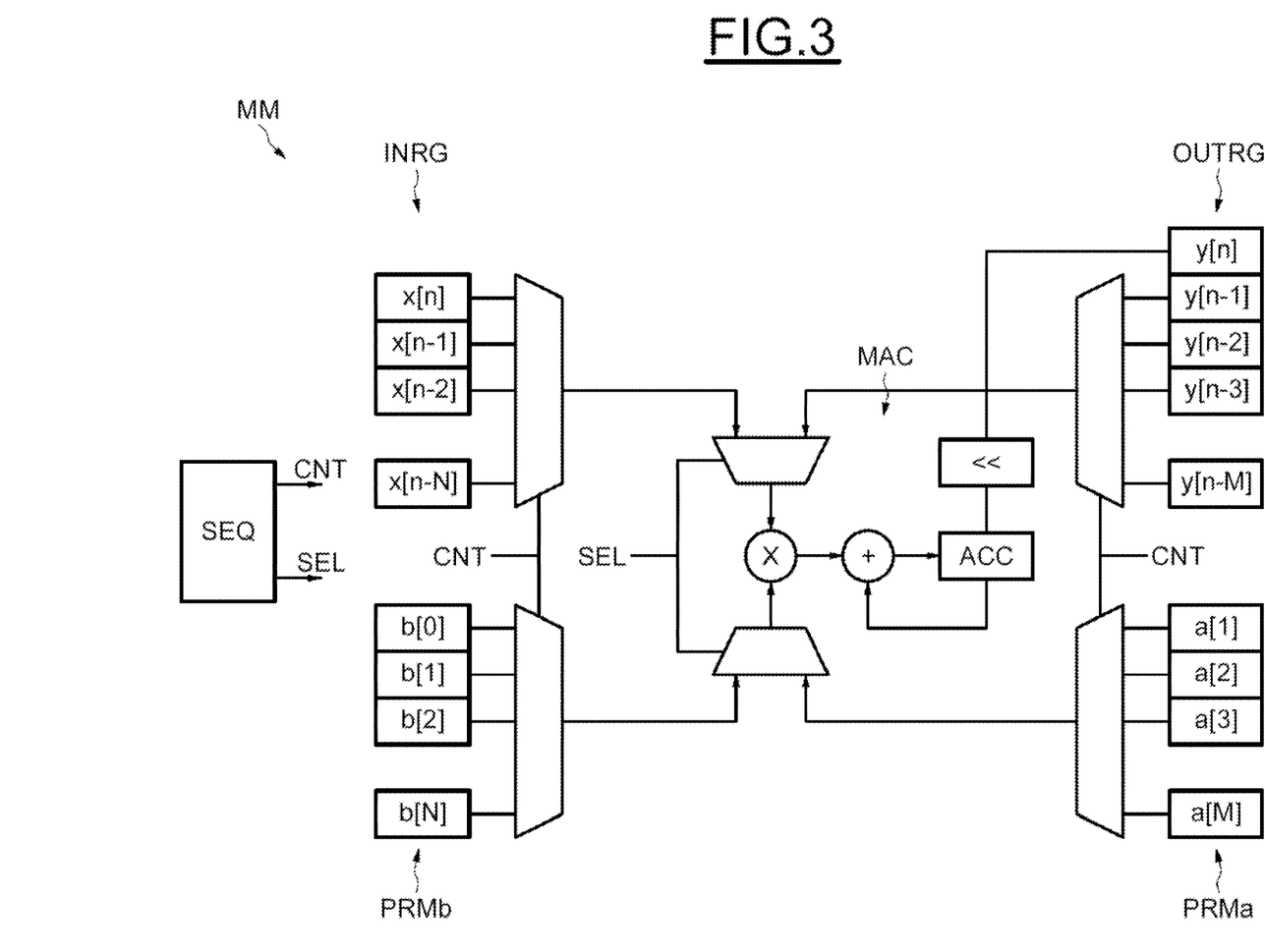

Each convolution is a sum of products. Thus, the successive convolutions of the infinite impulse response filter IIR are hardware executed by the hardware module by means of a multiplier-accumulator circuit MAC (FIG. 3).

Delay elements, e.g., flip-flops, Z−1 store the previous values of the input x[n] and output y[n] samples for implementing the shifts.

The action coefficient b[i] and feedback coefficient a[j] vectors mathematically define all the characteristics of the filters FIR, IIR.

In this example, the processing TRT may be parameterized so as to select the computational portion of the hardware module MM corresponding to the finite impulse response filter FIR, or the computational portion of the hardware module MM corresponding to the infinite impulse response filter FIR.

The length of the filter, or the order of the filter, i.e., the number N or M of delays Z−1, may also be parameterized notably according to the needs of execution speed and the capacity of the registers.

FIG. 3 represents an embodiment of the hardware module MM configured for hardware executing the processing. This example may correspond, but not necessarily, to the filter example described in relation to FIG. 2.

The hardware module MM comprises an input register INRG, an output register OUTRG, at least one (here, two) parameter register(s) PRMb, PRMa, a multiplier and accumulator circuit MAC, and a sequencer SEQ.

The input register INRG is intended to receive input values x[n] of the processing. The output register OUTRG is intended to supply output values y[n] of the processing. The parameters registers PRMb, PRMa are configured for storing the values of the parameters b[i], a[i] parameterizing the processing.

The input values x[n−N], ..., x[n−1], x[n] are chosen successively from the input register INRG e.g. by a multiplexer controlled by an indexing signal CNT, and transmitted to the multiplier and accumulator circuit MAC.

Similarly, the output values y[n−M], ..., y[n−1], y[n], and the coefficient values b[N], ..., b[1], b[0]; a[M], ..., a[2], a[1], are transmitted successively by multiplexers controlled by the indexing signal CNT, from the respective register to the multiplier and accumulator circuit MAC.

The multiplier and accumulator circuit MAC, is configured for hardware executing multiplication operations between two terms selected in the registers by a selection signal SEL. Here, the selection signal SEL is used to choose a pair of values in the input register INRG and in the first coefficients register PRMb, or a pair of values in the output register OUTRG and in the second coefficients register PRMa.

The circuit MAC is configured for hardware executing a cumulative sum ACC of each product thus calculated.

The sequencer SEQ is in turn hardware configured for notably generating the indexing signal CNT and the selection signal SEL.

The sequencer SEQ thus makes it possible to hardware drive the multiplier and accumulator circuit MAC, so as to execute the processing, of a specific type.

Thus, by hardware modifying the sequencer SEQ, the hardware module MM may execute other types of processing, notably matrix calculations such as multiplications, additions, dot products, determinant calculations, adjunctions, or other.

In addition, with an address reordering unit, such as, for example, a direct memory access driver device DMA, the hardware module MM may be configured for hardware executing fast Fourier transforms.

It is further conceivable to add additional multiplier-accumulator circuits MAC, for increasing the speed of execution of the chosen processing.

FIG. 1 is again referred to, taking the case of the microcontroller MC comprising a direct memory access driver device DMA.

The hardware module MM, as described in relation to FIG. 3, may advantageously be configured for generating write requests in the input register INRG intended for and adapted to the direct memory access driver device DMA; and read requests in the output register OUTRG, also intended for and adapted to the direct memory access driver device DMA.

Thus, no interrupt signal to the CPU is transmitted on the bus BS, and the entire input-output stream of the hardware module MM is driven by the direct memory access driver device DMA. The processor CPU of the microcontroller MC is thus completely free of processing operations other than the processing.

Figure 4:
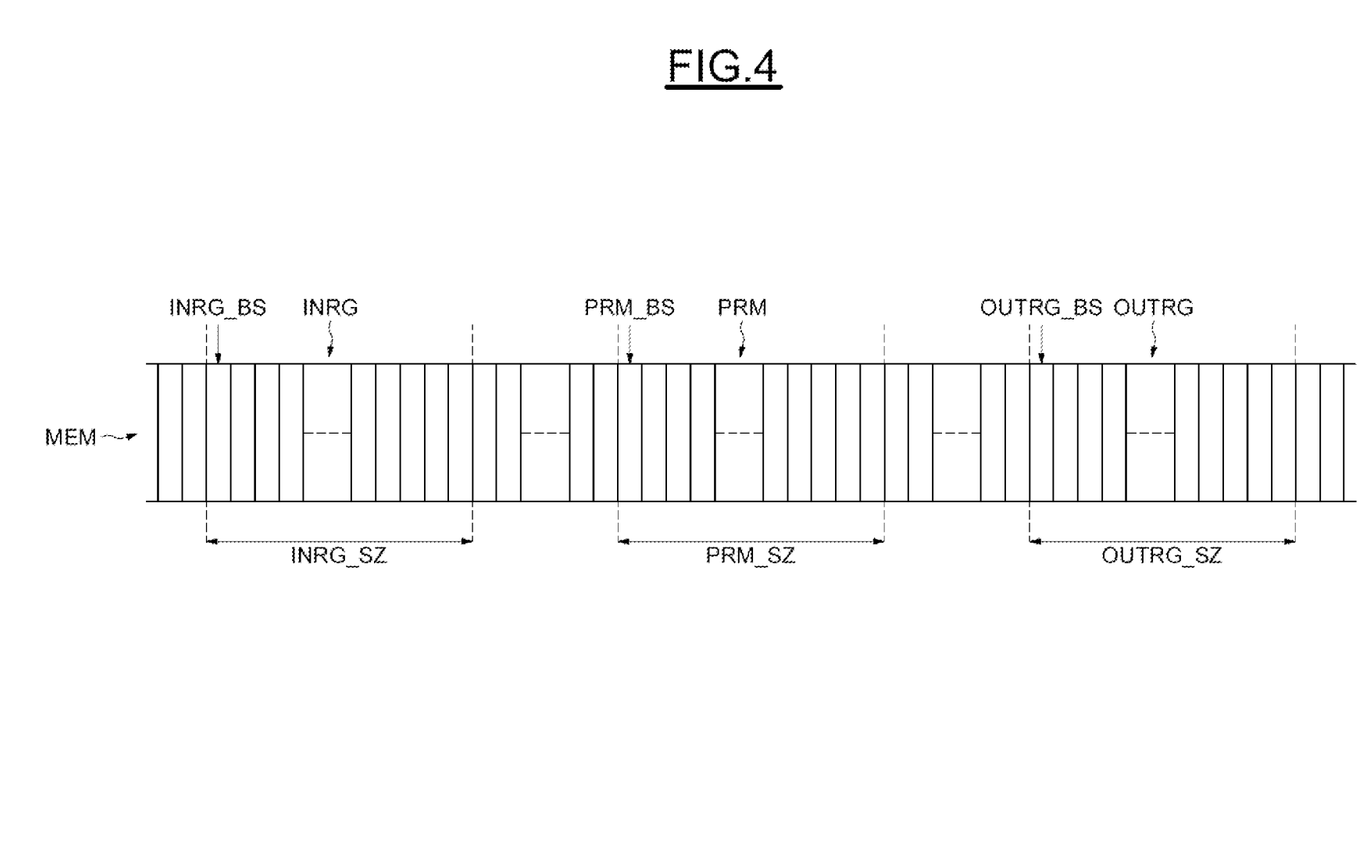

Reference is now made to FIG. 4.

FIG. 4 represents an embodiment of the hardware module MM described above in relation to FIG. 3.

In this embodiment, the input register INRG, the output register OUTRG and the at least one parameters register PRM are located in respective memory locations in a shared register MEM.

Each memory location is defined by a base address _BS, and by the size of the location _SZ.

Thus, the input register INRG is allocated a base address INRG_BS, and a size INRG_SZ. Each coefficient register PRM is allocated a base address PRM_BS and a size PRM_SZ. The output register OUTRG is allocated a base address OUTRG_BS, and a size OUTRG_SZ.

The memories of the registers are circular, a new element overwrites the oldest element. This means that when an element is no longer necessary, it is replaced with a new element, e.g., by transfer from the DMA driver or the CPU.

The size of the locations may be greater than the delay lines of the function of the hardware module MM, which allows data transfers in bursts and reduces the probability of drop-out. The delay lines of the function are embodied, with reference to FIG. 2, by the number of successive delay elements Z−1, or else, with reference to FIG. 3, by the numbers N and M. This is the quantity of successive input and output values used in calculating a new output value.

For example, the size of the locations is dimensioned for storing a multiple of the number of delays of the delay line of the function of the hardware module MM.

Thus, the input register INRG, the output register OUTRG and the at least one parameters register PRM are capable of receiving and storing groups of values intended for a future execution of the processing.

Accordingly, when successive data arrive in greater numbers than the delay line of the function of the hardware module MM, the data can be stored without having to wait for the first data of the sequence to be able to be overwritten.

Moreover, in the present case, where the registers INRG, OUTRG, and PRM are located in respective memory locations in a shared register MEM, the hardware module MM may be capable of receiving an additional parameterization of the base addresses and sizes of the locations.

This embodiment with a single shared memory makes it possible to optimize the use of the memory space. An optional dual-port memory may allow parallel access, e.g. to the input/output registers INRG/OUTRG and to the coefficients register PRM.

Figure 5:
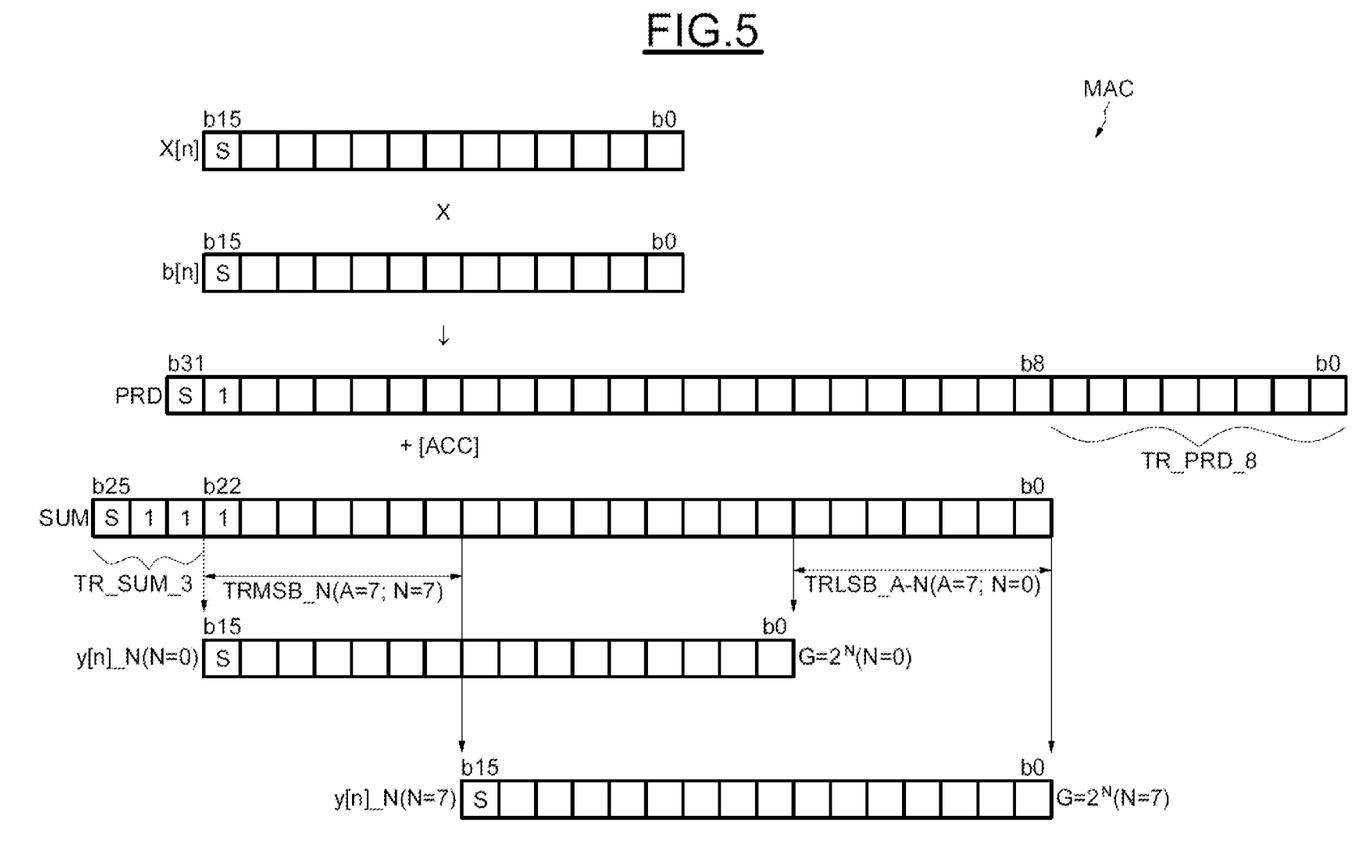

FIG. 5 represents an embodiment of the multiplier-accumulator circuit MAC of the hardware module MM as described above in relation to FIG. 3.

The example represented in FIG. 5 corresponds to a multiplication and accumulation of the input data x[n] by the coefficients b[n].

The table referenced x[n] represents a binary expression of an input datum x[n], over 16 bits b0 to b15.

The table referenced b[n] represents a binary expression of a coefficient b[n], over 16 bits b0 to b15.

Multiplying x[n]×b[n] gives a product computational value PRD, over 32 bits b0 to b31.

The accumulation ACC of the successive product computational values PRD would thus give a binary number over at least 32 bits.

However, since the input data values are coded over 16 bits, it is expected that the output data are also coded over 16 bits.

Accordingly, the multiplier-accumulator circuit MAC is configured for truncating the 8 least significant bits TR_PRD_8 of the product computational value PRD, resulting in a binary word over 24 bits b8 to b31.

The accumulation of the product computational values PRD forms an accumulation computational value SUM. The computational value SUM has a dynamic of 26 bits b0 to b25.

The multiplier-accumulator circuit MAC is further configured for truncating the 3 least significant bits TR_SUM_3 of the accumulation computational value SUM, resulting in a binary word over 23 bits b0 to b22.

In this example, in order to arrive at output data y[n] over 16 bits, the multiplier and accumulator circuit MAC is configured for implementing a parameterizable compromise between the dynamics of the processing values and the accuracy of these values.

The compromise is made on the accumulation computational value SUM, by truncation of N most significant bits TRMSB_N, in favour of accuracy and to the detriment of the dynamics, and by a corresponding truncation of A-N least significant bits TRLSB_A-N, to the detriment of accuracy and in favour of the dynamics. With A a positive integer, e.g. equal to 7, and N an integer such that $0 \leq N \leq A$.

At the end of these truncations TRMSB_N, TRLSB_A-N, an output datum y[n]_N is obtained.

Two examples of truncations parameterized by two values of N, N=0 and N=7, with A=7 are represented by the two representations of the output datum y[n]_N (N=0) and y[n]_N (N=7) in FIG. 5. Each output datum y[n]_N (N=0) and y[n]_N (N=7) is represented in alignment with the corresponding non-truncated portion of the accumulation computational value SUM.

A compensation gain value $2^N$ (2 to the power of N) is applied to the values of the output data y[n]_N. "Applied" means that the output data y[n]_N are implicitly weighted by a factor of $2^N$ and not written in binary format as the value resulting from this gain.

Thus, in the subsequent use of the output data y[n]_N, account must be taken of this unexpressed gain in the binary writing. In the example where the output data y[n]_N are intended to be multiplied with a feedback coefficient a[n], it is then possible to divide the values of the coefficients a[n] by $2^N$, for calculating terms of homogeneous dimensions, and end up with output data having the same gain $2^N$ as the input datum.

The hardware module may thus be configured for receiving the number N as a parameter representative of a compromise between the dynamics of the values resulting from the processing and the accuracy of these values. According to one possibility, the number A may also be one of the parameters parameterizing this compromise.

Figure 6:
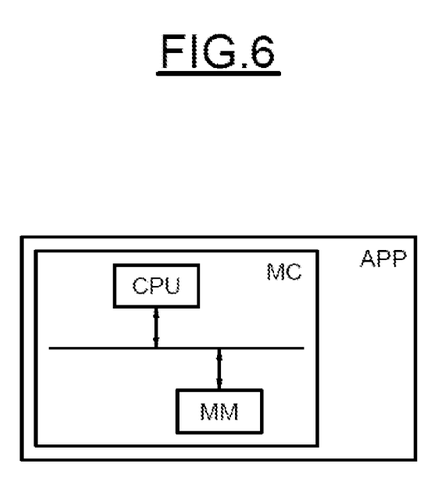

FIG. 6 represents an electronic apparatus APP such as an onboard computer of a vehicle, comprising a microcontroller MC comprising a hardware module MM, as described previously in relation to FIGS. 1 to 5.

Furthermore, the invention is not limited to these embodiments but encompasses all variants, e.g., the processing types described have been given by way of example, just as the function described in relation to FIG. 2 is in no way restrictive of the choice of processing.

What is claimed is:

1. A microcontroller comprising:
   a processor; and
   a hardware module coupled to the processor and configured to hardware execute a process selected from a group consisting of a digital filter, a matrix calculation, and a fast Fourier transform depending on a hardware configuration of a hardware-configured sequencer, the process being parameterizable by at least one parameter, the processor being configured to deliver the at least one parameter to the hardware module.

2. The microcontroller according to claim 1, wherein the hardware module comprises an input register configured to receive input values of the process, an output register configured to supply output values of the process, and a parameters register configured to store values of the at least one parameter.

3. The microcontroller according to claim 2, wherein the input register, the output register and the parameters register are located in respective memory locations in a shared register.

4. The microcontroller according to claim 2, wherein the input register, the output register and the parameters register are configured to receive and store groups of values intended for a future execution of the process.

5. The microcontroller according to claim 2, further comprising a direct memory access driver device, wherein the hardware module is configured to generate write requests in the input register, read requests in the output register, or write requests in the input register and read requests in the output register, the write requests, read requests, or the write requests and the read requests being intended for and adapted to the direct memory access driver device.

6. The microcontroller according to claim 1, wherein the hardware module comprises a multiplier and accumulator circuit and the hardware-configured sequencer is configured to drive the multiplier and accumulator circuit so as to execute the process.

7. The microcontroller according to claim 2, wherein the at least one parameter comprises at least one parameter representative of a compromise between dynamics of values resulting from the process and an accuracy of values resulting from the process, the multiplier and accumulator circuit being configured to implement the compromise during the execution of the process.

8. The microcontroller according to claim 7, wherein the multiplier and accumulator circuit is configured to truncate N most significant bits and A-N least significant bits on a computational value comprising M bits, with A being a positive integer such that A<M and N being an integer such that o≤N≤A, and applying a compensation gain 2N on values resulting from the truncation, the at least one parameter representative of the number N.

9. The microcontroller according to claim 8, wherein the at least one parameter is further representative of the number A.

10. A hardware module configured to hardware execute a process that is parameterizable by at least one parameter, the hardware module including an input configured to receive the at least one parameter from a processor of a microcontroller, the process being selected from a group consisting of a digital filter, a matrix calculation, and a fast Fourier transform depending on a hardware configuration of a hardware-configured sequencer.

11. The hardware module according to claim 10, further comprising a multiplier and accumulator circuit and, the hardware-configured sequencer being configured to drive the multiplier and accumulator circuit so as to execute the process.

12. The hardware module according to claim 11, wherein the at least one parameter comprises a parameter representative of a compromise between dynamics of values resulting from the process and an accuracy of values resulting from the process, the multiplier and accumulator circuit being configured to implement the compromise during the execution of the process.

13. The hardware module according to claim 12, wherein the multiplier and accumulator circuit is configured to truncate N most significant bits and A-N least significant bits on a computational value comprising M bits, with A being a positive integer such that A<M and N being an integer such that o≤N≤A, and to apply a compensation gain 2N on the values resulting from the truncation, the at least one parameter representative of the number N and the number A.

14. The hardware module according to claim 10, wherein the microcontroller is part of an onboard computer of a vehicle.

15. A hardware module configured to hardware execute a process that is parameterizable by at least one parameter, the hardware module comprising:
an input configured to receive the at least one parameter from a processor of a microcontroller;
an input register configured to receive input values of the process;
an output register configured to supply output values of the process;
a parameters register configured to store information representative of the at least one parameter; and
a hardware-configured sequencer, the process being selected from a group consisting of a digital filter, a matrix calculation, and a fast Fourier transform depending on a hardware configuration of the hardware-configured sequencer.

16. The hardware module according to claim 15, wherein the input register, the output register and the parameters register are located in respective memory locations of a shared register.

17. The hardware module according to claim 15, wherein the input register, the output register and the parameters register are configured to receive and store groups of values for a future execution of the process.

18. The hardware module according to claim 15, wherein the hardware module is configured to generate write requests in the input register, read requests in the output register, or write requests in the input register and read requests in the output register, the write requests, read requests, or the write requests and the read requests being intended for and adapted to an ancillary direct memory access driver device.

19. The hardware module according to claim 15, wherein the process is parameterizable by a plurality of parameters.

20. The hardware module according to claim 15, further comprising a multiplier and accumulator circuit, the hardware-configured sequencer being configured to drive the multiplier and accumulator circuit so as to execute the process.

* * * * *

UNITED STATES PATENT AND TRADEMARK OFFICE
CERTIFICATE OF CORRECTION

| | |
|---|---|
| PATENT NO. | : 11,204,739 B2 |
| APPLICATION NO. | : 16/599581 |
| DATED | : December 21, 2021 |
| INVENTOR(S) | : Mark Wallis et al. |

It is certified that error appears in the above-identified patent and that said Letters Patent is hereby corrected as shown below:

In the Claims

Claim 7, Column 8, Line 59; delete "2" and insert --6--.

Signed and Sealed this
Twenty-sixth Day of April, 2022

*Katherine Kelly Vidal*

Katherine Kelly Vidal
*Director of the United States Patent and Trademark Office*